US011115828B2

(12) United States Patent
Samdanis et al.

(10) Patent No.: US 11,115,828 B2
(45) Date of Patent: Sep. 7, 2021

(54) NETWORK MANAGEMENT METHOD AND SYSTEM FOR A SHARED RADIO ACCESS NETWORK, RAN, INFRASTRUCTURE (71) Applicant: NEC LABORATORIES EUROPE GMBH, Heidelberg (DE)

(72) Inventors: Konstantinos Samdanis, Munich (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 175 days.

(21) Appl. No.: 15/749,788

(22) PCT Filed: Aug. 25, 2015

(86) PCT No.: PCT/EP2015/069464
§ 371 (c)(1),
(2) Date: Feb. 2, 2018

(87) PCT Pub. No.: WO2017/025152
PCT Pub. Date: Feb. 16, 2017

(65) Prior Publication Data
US 2018/0227768 A1   Aug. 9, 2018

(30) Foreign Application Priority Data

Aug. 7, 2015  (EP) .................................... 15180127

(51) Int. Cl.
*H04W 16/14* (2009.01)
*H04W 8/02* (2009.01)
(Continued)

(52) U.S. Cl.
CPC ............. *H04W 16/14* (2013.01); *H04W 8/02* (2013.01); *H04W 16/10* (2013.01); *H04W 28/24* (2013.01)

(58) Field of Classification Search
CPC ... A45D 34/046; A45D 40/267; H04W 16/10; H04W 16/14; H04W 28/24; H04W 8/02
(Continued)

(56) References Cited

U.S. PATENT DOCUMENTS

2001/0036163 A1* 11/2001 Sabat, Jr. ............... H04W 16/14
                                                         370/328
2011/0158184 A1*  6/2011 Agulnik ................. H04W 28/18
                                                         370/329
(Continued)

FOREIGN PATENT DOCUMENTS

WO    WO 0152475 A2    7/2001
WO    WO 2010108540 A1  9/2010

OTHER PUBLICATIONS

3GPP TS 23.682 V13.2.0 (Jun. 2015), $3^{rd}$ Generation Partnership Project; Technical Specification Group Services and System Aspects; Architecture enhancements to facilitate communications with packet data networks and applications (Release 13), Jun. 2015, pp. 1-70.
(Continued)

*Primary Examiner* — Kibrom T Hailu
*Assistant Examiner* — Nizam U Ahmed
(74) *Attorney, Agent, or Firm* — Leydig, Voit & Mayer, Ltd.

(57) ABSTRACT

A method for performing network management for a shared Radio Access Network (RAN) infrastructure provided by a mobile network operator includes managing the shared RAN infrastructure by a master operator network manager of the mobile network operator; and allocating, by the master operator network manager upon receiving service requests from one or more tenants, resources to accommodate the service requests. The master operator network manager cooperates with a capacity or resource broker residing inside the network of the mobile network operator that considers information on mobility of a user or a set of users involved
(Continued)

in a particular service request for deciding on resource allocations to the particular service request.

15 Claims, 3 Drawing Sheets

(51) Int. Cl.
*H04W 16/10* (2009.01)
*H04W 28/24* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2013/0303114 | A1* | 11/2013 | Ahmad | H04M 15/49 455/406 |
| 2014/0086177 | A1* | 3/2014 | Adjakple | H04W 12/08 370/329 |
| 2014/0307701 | A1* | 10/2014 | Markwart | H04W 72/0493 370/329 |
| 2015/0023257 | A1* | 1/2015 | Lee | H04W 72/048 370/329 |
| 2016/0044702 | A1* | 2/2016 | Centonza | H04W 24/08 370/328 |
| 2016/0127951 | A1* | 5/2016 | Skarp | H04W 28/26 |

OTHER PUBLICATIONS

3GPP TS 32.130 V12.0.0 (Dec. 2014), 3$^{rd}$ Generation Partnership Project; Technical Specification Group Services and System Aspects; Telecommunications management; Network sharing; Concepts and requirements (Release 12), Dec. 2012, pp. 1-15.

3GPP TR 22.852 V13.1.0 (Sep. 2014), 3$^{rd}$ Generation Partnership Project; Technical Specification Group Services and System Aspects; Study on Radio Access Network (RAN) sharing enhancements (Release 13), Sep. 2014, pp. 1-34.

3GPP TS 23.251 V13.1.0 (Mar. 2015), 3$^{rd}$ Generation Partnership Project; Technical Specification Group Services and System Aspects; Network Sharing; Architecture and functional description (Release 13), Mar. 2015, pp. 1-39.

* cited by examiner

NETWORK MANAGEMENT METHOD AND SYSTEM FOR A SHARED RADIO ACCESS NETWORK, RAN, INFRASTRUCTURE

CROSS REFERENCE TO RELATED APPLICATIONS

This application is a U.S. National Stage Application under 35 U.S.C. § 371 of International Application No. PCT/EP2015/069464 filed on Aug. 25, 2015, and claims benefit to European Patent Application No. EP 15180127.1 filed on Aug. 7, 2015. The International Application was published in English on Feb. 16, 2017 as WO 2017/025152 A1 under PCT Article 21(2).

FIELD

The present invention generally relates to a method of performing network management for a shared Radio Access Network, RAN, infrastructure provided by a mobile network operator. Furthermore, the present invention relates to a network management system for a shared Radio Access Network, RAN, infrastructure provided by a mobile network operator.

BACKGROUND

As mobile network operators are facing a tremendous traffic increase, there is a need to evolve the infrastructure such that new revenue sources can be exploited. Network sharing provides Mobile Network Operators (MNO) a way for reducing capital expenditures while enabling incorporating additional revenue sources. The initial adoption of network sharing in the third Generation Partnership Project (3GPP) concentrated on passive solutions, wherein mobile operators share base station sites, masts, antennas, etc. Active sharing followed enabling operators to share radio network resources for fixed, i.e. long term, periods according to contractual agreements. For active network sharing 3GPP specified two architectures in (for reference, see 3GPP TS 23.251, Network Sharing; Architecture and Functional Description, Rel.12, June 2014): (i) the Multi-Operator Core Network (MOCN), where each operator shares base stations connected to core network elements that belong to each MNO using a separate S1 interface and (ii) the Gateway Core Network (GWCN), where operators additionally share the Mobility Management Entity (MME).

SUMMARY

In an embodiment, the present invention provides a method for performing network management for a shared Radio Access Network (RAN) infrastructure provided by a mobile network operator. The method includes managing the shared RAN infrastructure by a master operator network manager of the mobile network operator; and allocating, by the master operator network manager upon receiving service requests from one or more tenants, resources to accommodate the service requests. The master operator network manager cooperates with a capacity or resource broker residing inside the network of the mobile network operator that considers information on mobility of a user or a set of users involved in a particular service request for deciding on resource allocations to the particular service request.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention relate to a method and system that go beyond the aforementioned 3GPP solutions such that dynamic, on-demand resource allocation is introduced purely based on signaling (i.e. without human intervention). This provides an autonomous manner in which to configure resources for addressing incoming requests associated with particular services or Mobile Virtual Network Operators (MVNOs). To manage efficiently such dynamic resource sharing, this invention assumes the presence of a physically centralized or logically centralized monitoring and control entity referred to as capacity broker that resides inside the MNO infrastructure, for instance as described in 3GPP TR 22.852, Study on Radio Access Network (RAN) Sharing enhancements, Rel.13, September 2014. The capacity broker receives incoming requests from Over-The-Top (OTT) services and application providers as well as from MVNOs, which are typically referred as tenants, assesses such requests and allocates network resources considering the Service Level Agreements (SLAs).

A method for integrating a similar capacity broker entity, referred to as Virtual-layer Network Manager Function (VNMF) that orchestrates the virtual resource allocation among multi-MVNOs was also introduced in US 2013/0303114 A1.

Embodiments of the present invention improve and further develop a method of performing network management for a shared Radio Access Network, RAN, infrastructure and a network management system for a shared Radio Access Network, RAN, infrastructure in such a way that multi-tenancy support is achieved that enables on-demand resource allocation towards different tenants in a dynamic and resource-efficient fashion.

According to an embodiment of the invention, a method is provided for performing network management for a shared Radio Access Network, RAN, infrastructure provided by a mobile network operator, comprising: managing said shared RAN infrastructure by means of a master operator network manager of said mobile network operator, said master operator network manager, upon receiving service requests from one or more tenants, allocating resources to accommodate said service requests, wherein said master operator network manager cooperates with a capacity or resource broker residing inside the network of said mobile network operator that considers information on the mobility of the user or the set of users involved in a particular service request for deciding on the resource allocations to said service request.

Furthermore, according to an embodiment of the invention, a network management system is provided for a shared Radio Access Network, RAN, infrastructure provided by a mobile network operator, comprising: a master operator network manager of said mobile network operator for managing said shared RAN infrastructure, wherein said master operator network manager is configured to receive service requests from one or more tenants and to allocate resources to accommodate said service requests, and a capacity or resource broker that is configured to consider information on the mobility of the user or the set of users involved in a particular service request for deciding on the resource allocations to said service request.

According to embodiments of the invention, the capacity or resource broker architecture can be fully exploited when the impact of incoming resource requests on the mobile network resources is efficiently assessed by considering the cells that are expected to be affected by the requests. In this regard, embodiments of the present invention propose a corporation between the master operator network manager and the capacity or resource broker in which the mobility of the user or the set of users involved in a particular service request is considered for deciding on the resource allocations to this request. In other words, according to embodiments of the present invention the allocated resources account for device mobility. In contrast to solutions where resources are allocated by only considering the current location of the user(s), i.e. at the time of placing the respective service request, embodiments of the present invention enable an efficient and optimized usage of the network infrastructure by selecting the resources that can be used for each service type and the corresponding set of cells involved for each service request, thereby significantly reducing the wasting of resources. More efficient infrastructure resource utilization results in higher revenue opportunities for mobile network providers.

According to embodiments of the invention the capacity or resource broker may be placed at or may be implemented as part of the network management system of the infrastructure provider. Specifically, in case of a 3GPP network architecture, the capacity or resource broker may be placed at or may be implemented as part of the master operator network manager, i.e. the network management entity of the operator that provides the network infrastructure.

According to embodiments of the invention, a logical implementation of the capacity or resource broker may be realized, which may consist of a number of EPCs (Evolved Packet Cores) and network management entities. In this way, an introduction of the capacity or resource broker as a stand alone network entity requiring connectivity, i.e. a number of newly defined interfaces, towards the remaining of the 3GPP network, can be avoided. Specifically, according to embodiments of the invention the capacity or resource broker may be implemented as a logically centralized network function that is composed by functions that reside on the master operator network manager, on the master operator shared RAN domain manager, on shared network elements of said shared RAN infrastructure, on the PCRF (Policy and Charging Rules Function) and/or on the MME.

According to embodiments of the invention it may be provided that the capacity or resource broker selects a set of cells to allocate resources with respect to a service request based on the current locations of the user or the set of users involved in the service request together with information on prior user mobility, and/or based on a user mobility profile. Furthermore, it may be provided that the capacity or resource broker performs the cell selection by additionally considering the SLA specified for that service request, and/or the time duration of the service request.

According to embodiments of the invention the capacity or resource broker may implement a forecasting function that performs traffic and/or user mobility forecasting, i.e. that considers user mobility information to perform resource management decisions. Alternatively, this mobility information could be explicitly provided by MVNOs and OTTs, if available. For instance, this traffic and/or user mobility forecasting could be performed by relying on historical and/or current data, by exploiting temporal and/or spatial dependence forecasting models, by using signal processing based techniques, and/or by using recursive updating schemes. The capacity or resource broker may then select a set of cells to allocate resources with respect to a service request based on information resulting from this forecasting function.

According to embodiments of the invention it may be provided that the information on the current location of users or a set of users involved in a particular request are provided to the capacity or resource broker by user equipment assisted mechanisms or by network based discovery mechanisms.

According to embodiments of the invention the tenants may direct resource or service requests on-demand to the master operator network manager. These requests may be configured to contain at least one of an OTT application id, a service provider id, an OTT session id, a public land mobile network (PLMN) id, a specification of the requested resource allocation (e.g. resource blocks), the type of the request (e.g. periodic, on-demand), a service starting time and/or duration, resource type and/or QoS (e.g. radio bearer types). Additionally or alternatively, the resource requests may be configured to contain mobility related information (e.g. considering stationary users and average mobility speed, for instance with the grades low, medium and high), a mobility area and/or Tracking Area. Furthermore, the resource requests may be configured to additionally contain parameters for assisting traffic patterns predictability, e.g. keep alive messages in relation with particular applications, connection properties (high, medium, low throughput) and/or expected QoS considering the tolerance risk of resource starvation.

According to embodiments of the invention a set of different interface enhancements is introduced, considering the Inf-N, Inf-B, Type 5 interface and/or Application API in order to provide information regarding different tenants, the affected cells, type of requests, timing aspects and/or QoS, and to enable the interface to accommodate information contained in the respective resource requests. The embodiments regarding the different interfaces are as follows:

The existing 3GPP Int-N interface may be extended to accommodate information regarding the following but not exclusive list including the OTT application or OTT session id or service provider id or PLMN id, list of cells, and per cell or set of cells resource allocation (e.g. resource blocks) and type of request (periodic, on-demand), resource type, time duration, QoS (e.g. radio and/or core network bearer types) and update information about offloading policies and mobility considering stationary users and average mobility speed (low, medium, high) as well as the mobility area or Tracking Area (TA). Additionally or alternatively, the existing 3GPP Int-N interface may be configured to support resource and performance monitoring per OTT application or OTT session id or service provider id or PLMN-id or MVNO identifier either per eNB or aggregated considering a set of eNBs. To accomplish this, an OTT application provider or session identifier, the PLMN-id or some other related identifier may be introduced inside the monitoring packets related to a particular MVNO.

The existing 3GPP Int-B interface may be extended to accommodate information regarding the following but not exclusive list including the OTT application id or service provider id or OTT session id or PLMN id, resource allocation (e.g. resource blocks), type of request (periodic, on-demand), time duration, resource type and QoS (e.g. radio bearer types). According to embodiments, the existing 3GPP Int-B interface may also reflect mobility considering e.g. stationary users and average mobility speed (e.g. low, medium, high). Additionally or alternatively, the existing 3GPP Int-B interface may be configured to support resource and performance monitoring per OTT application id or service provider id or OTT session id or PLMN-id or MVNO identifier. To accomplish this, the PLMN-id or some other related OTT application provider or session identifier may be introduced inside the monitoring packets related to a particular MVNO.

The existing 3GPP Type 5 interface may be extended to accommodate dynamic resource requests from MVNOs, which contain the following but not exclusive list of information including the PLMN id, list of cells (including potential cells due to user mobility profile), the resource allocation (e.g. resource blocks, throughput) and type of request (periodic, on-demand), resource type, time duration. Additionally or alternatively, this interface may be configured to support resource and performance monitoring per PLMN-id or MVNO identifier, either per eNB or aggregated considering a set of eNBs. To accomplish this, the PLMD-id or some other related identifier may be introduced inside the monitoring packets related to a particular MVNO and to distinct monitoring and performance information towards particular MVNOs.

According to embodiments of the invention the tenants may include mobile virtual network operators (MVNOs) comprising a sharing operator network manager that is configured to receive resource allocations from the master operator network manager. In this regard, it is noted that a Type 5 Interface between the master operator network manager and the sharing operator network manager, comprising enhancements that will be explained in detail below, can be used to provide resource and performance monitoring information towards MVNOs.

According to embodiments of the invention the tenants may include third parties in a 3GPP architecture, i.e. service and/or application providers, like over-the-top content, OTT, application providers. In this regard it may be provided that a Service Capability Exposure Function (SCEF) that is placed in the network management system of the infrastructure provider, i.e. in case of 3GPP at the master operator network manager, is configured to use the capacity or resource broker for resource/capacity and/or SLA provisions/allocations/ to the application providers. By positioning the SCEF at the master operator network manager, the SCEF is not only exposing information for devices, e.g. MTC devices as in the case of OMA API, but can also use the capacity broker and the master operator network manager direct and indirect interfaces, i.e. Inf-N and Inf-B, to control SLAs and allocate resources.

Figure 1:
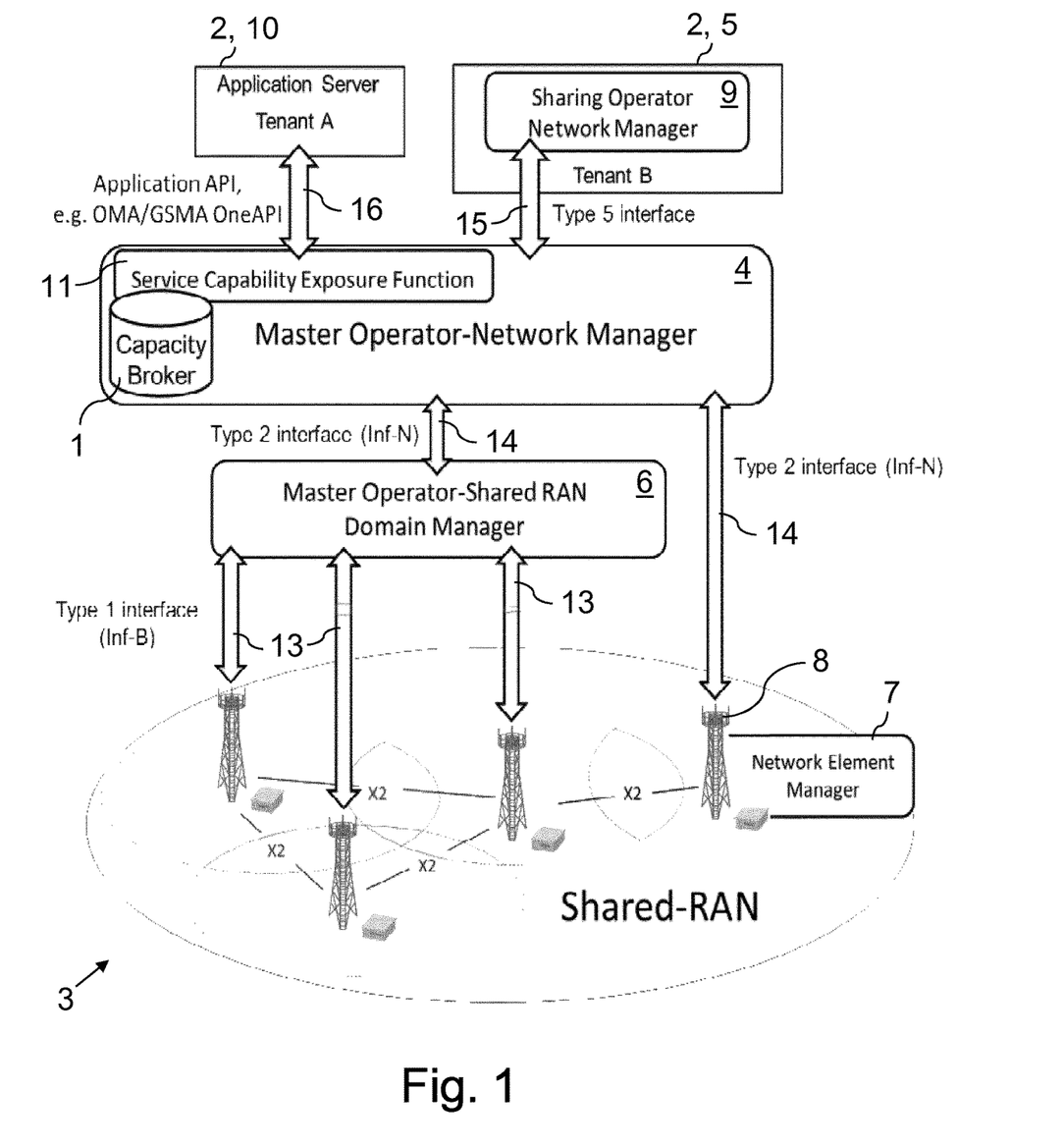
FIG. 1 is a schematic view illustrating a capacity broker centric network sharing management architecture in an MOCN scenario in accordance with an embodiment of the present invention.

FIG. 1 is a schematic view illustrating a 3GPP LTE network management architecture with multi-tenancy support accommodating a capacity or resource broker 1 in an MOCN (Multiple Operator Core Network) scenario in accordance with a first embodiment of the present invention. The capacity or resource broker 1 is integrated in the network management architecture to facilitate network sharing among multiple tenants 2 in a mobile network or, more specifically, in a shared RAN 3. While the present invention can be applied in connection with various network management architectures, in the illustrated embodiment the focus is on the 3GPP Long Term Evolution (LTE), considering the network management architecture described in 3GPP TS 32.130, "Telecommunication management; Network Sharing; Concepts and requirements", Rel.12, December 2014, which is incorporated herein by way of reference.

According to this architecture the master operator network manager 4, i.e. the network management entity of the operator that provides the infrastructure of the mobile network 3, offers network sharing capabilities for certain regions of the radio access network to different tenants 2 including mobile virtual network operators 5, referred to as sharing operators in 3GPP terminology, and to third parties. In the 3GPP network management architecture for enabling network sharing the master operator network manager 4 is defined as the Integration Reference Point (IRP) manager that monitors and controls the shared network elements via the IRP agent, which either resides in the master operator shared RAN domain manager 6 or in a network element manager 7 of a shared eNB 8. The master operator network manager 4 in turn enables the sharing operator network manager 9, i.e. the network management system of the mobile virtual network operator 5, to monitor and control the corresponding allocated resources.

As already briefly mentioned above, the illustrated embodiment facilitates network sharing enabling a centralized physical or logical management entity, i.e. a capacity broker or resource broker 1, to perform resource allocations for incoming OTT services or MVNO resource requests considering, e.g., an explicitly indicated starting time and duration as well as an SLA (Service Level Agreement), e.g. delay, throughput, loss, jitter, etc. Optionally, a mobility profile (e.g. stationary, pedestrian, vehicular, high speed, etc.) could be added as information explicitly included in the request.

As shown in FIG. 1, in accordance with an embodiment of the invention the capacity or resource broker 1 is placed at or is a part of the master operator network manager 4 to facilitate admission control and Service Level Agreement (SLA) negotiation with MVNOs 5 and third parties, e.g. with application servers 10 of OTT providers. The capacity or resource broker 1 can use the existing network monitoring information that is collected at the master operator network manager 4 in order to take a decision on resource allocation. Further, the capacity or resource broker 1 can use the existing interfaces, amended to control and allocate resources accordingly. In particular, it may be provided that existing interfaces, i.e. type1, type 2, type 5 interfaces, are adapted to accommodate enhancements regarding the following but not exclusive list including the service or PLMN id, resource allocation (e.g. resource blocks), type of request (e.g. periodic, on-demand), time duration, resource type and QoS (e.g. radio bearer types). In addition, these interfaces may be adapted to support performance monitoring per service or PLMN-id by introducing an identifier inside the corresponding monitoring packets.

In addition, the provision of resources and SLA for OTT application providers 10 can be achieved by positioning the Service Capability Exposure Function (SCEF) 11 at the master operator network manager 4. In this way the SCEF 11 is not only exposing information for devices, e.g. MTC devices, as in the case of OMA API, but can also use the capacity or resource broker's 1 and the master operator network manager's 4 direct and indirect interfaces, i.e. Inf-N and Inf-B, to control SLAs and allocate resources.

For OTT application providers 10 and third party services, the provision of resources (e.g. per user or groups of users) can be achieved via the Service Capability Exposure Function (SCEF) 11. As specified in 3GPP TR 23.682: "Architecture enhancements to facilitate communications with packet data networks and applications", Rel.13, June 2015, the SCEF 11 interacts with the PCRF to request the necessary QoS changes as indicated by the OTT or $3^{rd}$ party services. The master operator network manager 4 may interact with the SCEF 11 to gather network information indicated/requested by OTT or $3^{rd}$ party services, while the master operator network manager 4 can also use the capacity broker 1 to control SLAs and allocate resources. There are multiple options how the information from OTT providers and third party services can become accessible at the master operator network manager 4. According to one embodiment the SCEF 11 may provide the information directly to the master operator network manager 4. Another example is that the changed QoS levels from the PCRF are informed to the master operator network manager 4.

Generally, embodiments of the present invention relate to methods and systems that assist a capacity broker based network sharing architecture as described above to identify the set of cells, where a user or a set of users associated with a particular OTT service or Mobile Virtual Network Operator request are expected to need resources from (during the time period of the request) considering a number of parameters including, e.g., the duration period of the request, service level agreements and optionally the users' mobility profile. As will be described in more detail below, embodiments of the present invention take advantage of a user mobility/traffic forecasting function, which is introduced in the capacity broker 1 based on the information available at the infrastructure provider considering the user or set of users involved in a request. In particular, such mobility forecasting assists the capacity broker 1 to derive a set of cells accounted by the resource allocation algorithm. In other words, the traffic forecasting considers user mobility to perform efficient resource management, allocating resources on particular cells that are likely to be visited, increasing in this way the resource availability and the amount of requests that can be accommodated. A main challenge is the fact that the required capacity should account for device mobility. Furthermore, the available capacity may vary due to the unpredictable characteristics of the mobile networks, e.g. position of users within a cell, radio quality variations, etc.

According to embodiments of the invention incoming requests also contain an MVNO or OTT identifier and, optionally, indicate the current location of users/customers, e.g. by indicating cells or base stations, tracking areas etc., as well as a mobility profile. The current location of users can optionally be provided by UE assisted methods or by conventional network based discovery methods after the MVNO 5 indicates its id to the infrastructure provider, i.e. MNO. Based on this information the MNO allocates resources to accommodate incoming requests considering the information provided. Effectively, according to embodiments of the invention service request requirements are mapped to network resources, e.g. resource blocks for LTE, and the cells potentially affected when accommodating them are derived by (i) performing traffic forecasting for selected cells and (ii) considering cumulative user mobility information monitored by the network, e.g. user gravity points, or mobility rate among base stations or other mobility statistics. The mobility forecasting function introduced enables for a more efficient and accurate infrastructure resource utilization and thus, allowing a larger number of requests accommodated, i.e. higher revenues.

Figure 2:
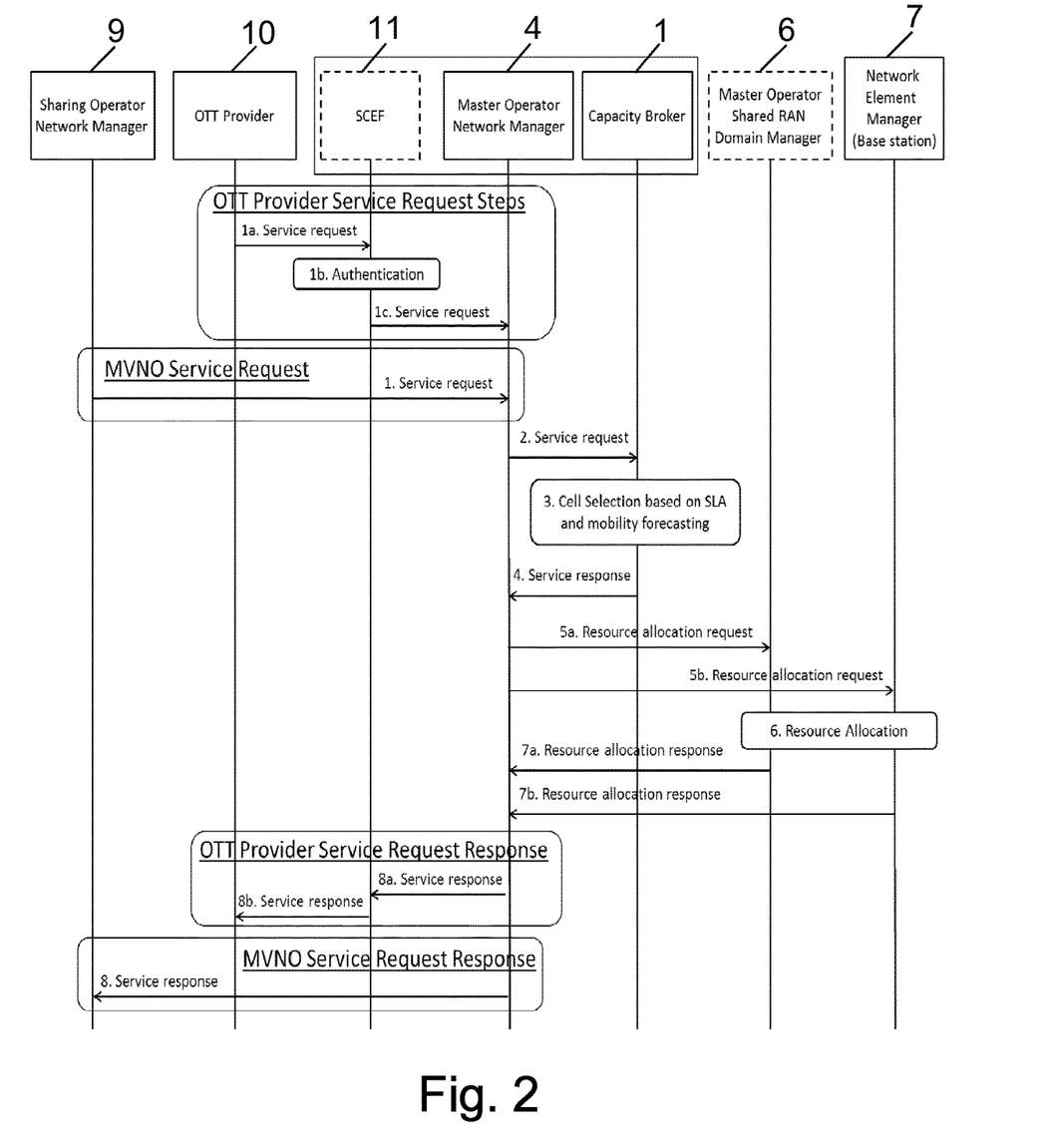
FIG. 2 is a flow chart illustrating resource allocation upon incoming resource requests from an MVNO or OTT provider in accordance with an embodiment of the present invention.

FIG. 2 illustrates a process in accordance with embodiments of the present invention for allocating resources associated with a service request of an MVNO 5 (only the associated sharing operator network manager 9 of MVNO 5 is illustrated in FIG. 2) or OTT provider 10 selecting an appropriate set of cells that can accommodate the desired SLAs. When a new service request is issued by an OTT provider 10 (shown as OTT provider service request in steps 1a, 1b, 1c) or by an MVNO 5 (shown as MVNO service request in step 1) it reaches the master operator network manager 4 either through the SCEF 11, which provides authentication first for an OTT service request, or directly via a type 5 interface 15 for the case of an MVNO request.

As shown in step 2, the master operator network manager 4 forwards the service request internally to the capacity broker 1, which in turns selects a set of cells that should allocate resources to the request based, e.g., on the desired SLAs and mobility forecasting (as shown in step 3). If the service request is accepted, the capacity broker 1 returns to the master operator network manager 4 a set of cells and the corresponding resources that should be allocated for accommodating the service request (as shown in step 4).

As shown in step 5a and step 5b, the master operator network manager 4 forwards the resource configuration control to the selected set of cells via a type 2 interface, Inf-N (denoted by reference numeral 14 in FIG. 1), i.e. towards the master operator shared RAN domain manager 6 and/or to particular network element manager 7 of each base station 8. The resource allocation at particular base stations 8 is performed in step 6 by the master operator network shared RAN domain manager 6 via the type 1 interface, Inf-B (denoted by reference numeral 13 in FIG. 1), or directly via the network element manager 7 at each base station 8, and a resource allocation response is then issued back to the master operator network manager 4 (as shown in step 7a and step 7b). Finally, the master operator network manager 4 distributes a service response towards the OTT provider 10 (shown in 'OTT provider service request response' in step 8a and step 8b) or towards MVNO 5 (shown in 'MVNO service request response' in step 8), providing information regarding the requested service. This step can also be used to inform the OTT providers 10 and MVNOs 5 in case of a negative response, i.e. in case there are no available resources, so no cells that can accommodate the service request can be selected.

In the above embodiments, in order to achieve the aforementioned resource allocation goals, the capacity broker 1 performs mobility forecasting based on prior and/or current data regarding the affected cells, optionally in addition with mobility information regarding neighboring cells. In this context, a risk or confidence degree for the prediction can be considered. The forecasting algorithm enables the capacity broker 1 to take more accurate decisions when allocating resources to MVNOs 5 as well as service and application providers 10 on-demand. The ultimate goal of the mobility forecasting for mobile infrastructure providers is to facilitate them with a tool that enables to use in a more efficient way the resources that would otherwise be unutilized, allowing for increased revenue. Forecasting typically relies on historical data, current data, or both, to forecast the mobility and/or traffic in some interval or time period in the future. Embodiments of the invention exploit temporal and spatial dependence forecasting models and signal processing based techniques since these models perform well in cases where a traffic prediction decisions are needed within short time frames. Different forecasting algorithms can be used by the capacity broker 1 as, for instance, a recursive scheme where the forecast is updated at each observation of the considered phenomena.

Due to the non-uniform way of the movement of users, which is common in wireless networks, the traffic load exhibits a high degree of irregularities along time. This fact makes the prediction process challenging. To enhance the accuracy of prediction, forecast signal decomposition may be used or applied to extract regular patterns from the aggregated mobility forecasting information. In one embodiment this can be achieved by using Fast Fourier Transform (FFT) and Inverse FFT to extract regular patterns and process them separately. Since each traffic component in the time domain presents a more regular pattern than the initial traffic time series, the selected forecasting algorithm can then be applied on each component individually and finally the results can then be aggregated. The main reason for using such a decomposition of the initial traffic vector is the irregularities created by the non-uniform movement of the users in specific areas of the network infrastructure, e.g. due to the presence of gravity points wherein more users are concentrated.

According to an embodiment of the invention the set of potential cells that a user or a set of users involved in a respective service or resource request may visit is determined beginning by considering initially those cells, where each user or set of users are residing and potentially a number of neighboring cells including a greater area where a user or set of users may probably move within the duration of the request. Optionally, geographical constraints and cell vicinity may be considered by the forecasting function, i.e. the cells that can be possibly visited considering physical obstacles, e.g. roads, rivers, hills, etc. and the user or set of users movement direction, which can be updated regularly to provide a more accurate indication of the likelihood of needing a certain amount of resources at a particular location at specific times. In this context, the movement of users may be aggregated and a notion of a group movement may be introduced that corresponds to a summation of resources.

Further to the embodiments described so far, in the context of a scenario of FIG. 2 the following procedures may be realized: selecting the appropriate cells to allocate resources using mobility forecasting in relation with the acquired SLA, the time duration of the service request and/or based-on the user mobility profile, e.g. stationary, pedestrian, vehicular, high speed, selecting the set of cells to allocate resources based on the current user/s location and on prior mobility history, enabling the set of cells to allocate resources based on the prediction of user mobility considering locations where users are likely to with a higher probability, and/or updating the selection of cells to allocate resource based-on monitoring of the current user movements in relation with mobility forecasting.

Figure 3:
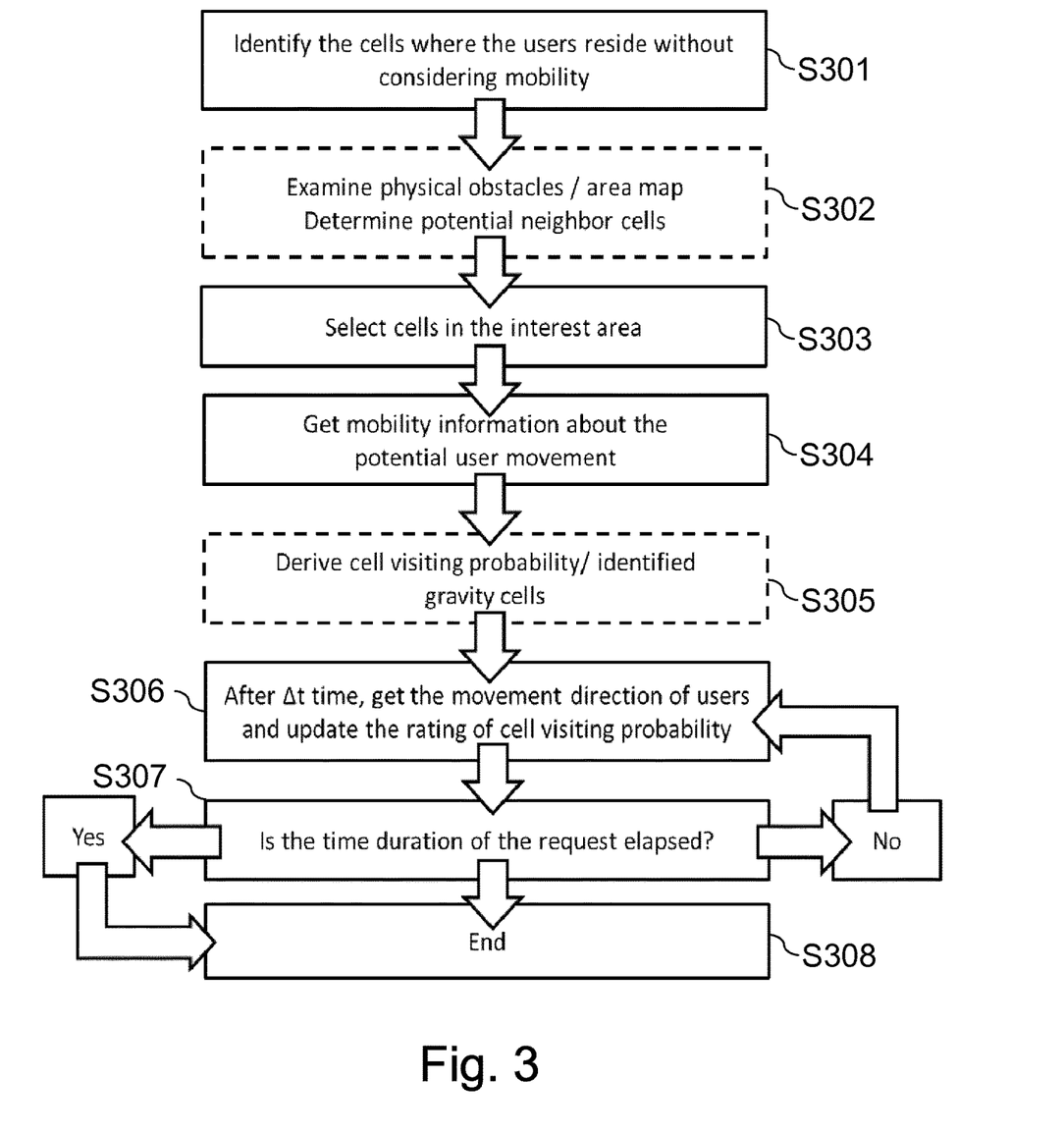
FIG. 3 is a flow diagram illustrating an aggregate user cell visiting mechanism for proactive resource provision in accordance with an embodiment of the present invention.

FIG. 3 illustrates an embodiment of the present invention that is based on an aggregate user cell visiting mechanism for proactive resource provision. FIG. 3 shows the main steps for determining required aggregated resources that would be needed to accommodate the SLAs associated with service, application or MVNO requests in a selected set of cells.

At first, in step S301, the cells where the user/s reside when the capacity request is placed, are being identified. This step can be performed by the master operator network manager 4 upon receipt of the request, either from an OTT provider 10 or from an MVNO 5.

In step S302, the cell vicinity of the 'initial' cells identified in step S301 are examined. For this purpose an area map may be employed. Furthermore, for examining the cell vicinity, i.e. neighbor cells of the 'initial' cells, physical obstacles, like e.g. roads, rivers, hills, etc., may be considering, if corresponding information is available in the network.

In step S303, cell selection is performed in the interest area without yet considering user mobility. For instance, it may be provided that rings of cells are selected around the initial cell(s) that have been identified in step S301 based on the initial (i.e. at the time of the service request placement) user location.

In step S304, the capacity broker 1 gathers and analyzes mobility information about the user(s). To this end, based on current and/or historic data a traffic and/or user mobility forecasting function implemented at the capacity broker 1 may perform forecasting of relevant user movements for the selected set of cells.

Based on these forecasting results, in step S305, the capacity broker 1 derives a probability for each of the selected cells that the user/users are going to visit that particular cell, preferably by considering heavy points of mobility and by identifying so called gravity cells.

In step S306, after a time duration Δt from the placement of the request, the capacity broker 1, based on information about the movement direction of the users involved in that request, updates the respective cell visiting probabilities.

As shown in step S307, the procedure keeps executing step S307 until the time duration of the request elapsed and the procedure terminates in step S308.

For a particular MVNO or OTT with several users an aggregated user cell visiting probability can also be derived by summing up the information related to the individual users. Furthermore, it may be provided to determine a confidence degree related to the forecasted traffic and mobility ensuring an efficient and profitable risk of prediction. The aggregated user cell visiting probability reflects the assurance of resource allocation towards certain cells with potentially higher traffic demands.

In particular, more resources are assigned to cells with higher user concentration considering a higher degree of confidence interval in the prediction. In addition, according to the user position within the cell the amount of requested resources differs, since users closer to the cell center require fewer resources to receive the same service in comparison to users located closer to the cell edge. This information should be considered when allocating resources for stationary users and in relation with the location of gravity points, i.e. to have knowledge of the resources required towards a high potential user destination.

In case of Centralized or Cloud RAN, where Network Function Virtualization (NFV) may allow selected base station functions to be virtualized and flexibly/dynamically positioned in a centralized cloud platform, the capacity broker 1 could additionally consider the SLA implications of base station functional decomposition and placement in relation with resource allocation and cell selection. That is, the selection of cells to allocate resources considers the base station functional decomposition and placement of virtualized functions.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 resource/capacity broker
2 tenant
3 mobile network/shared RAN
4 master operator network manager
5 mobile virtual network operator, MVNO
6 master operator shared RAN domain manager
7 network element manager
8 shared eNB
9 sharing operator network manager
10 application server of OTT provider
11 Service Capability Exposure Function, SCEF
12 Mobility Management Entity, MME
13 interface Inf-B
14 interface Inf-N
15 Type 5 interface
16 Application API
17 Type 4 interface Inf P2P

The invention claimed is:

1. A method for performing network management for a shared Radio Access Network (RAN) infrastructure provided by a mobile network operator, the method comprising:
managing the shared RAN infrastructure by a master operator network manager of the mobile network operator; and
allocating, by the master operator network manager upon receiving service requests from one or more tenants, resources to accommodate the service requests,
wherein the master operator network manager cooperates with a capacity or resource broker residing inside the network of the mobile network operator that considers information on mobility of a user or a set of users involved in a particular service request for deciding on resource allocations to the particular service request,
wherein the capacity or resource broker implements a forecasting function that performs traffic forecasting or user mobility forecasting, and
wherein the traffic forecasting or the user mobility forecasting is performed by relying on historical data or current data, by exploiting temporal dependence forecasting models or spatial dependence forecasting models, by using signal processing based techniques, and by using recursive updating schemes.

2. The method according to claim 1,
wherein the capacity or resource broker selects a set of cells to allocate resources with respect to the particular service request based on current locations of the user or the set of users involved in the particular service request together with information on prior user mobility, or based on a user mobility profile, and
wherein the set of cells is a subset of cells offered by the network of the mobile network operator.

3. The method according to claim 1,
wherein the capacity or resource broker selects a set of cells to allocate resources with respect to the particular service request based on the SLA specified for the particular service request or a time duration of the particular service request, and
wherein the set of cells is a subset of cells offered by the network of the mobile network operator.

4. The method according to claim 1, wherein the capacity or resource broker selects a set of cells to allocate resources with respect to a service request based on information resulting from said forecasting function.

5. Method according to claim 1, wherein information on a current location of the users or the set of users involved in the particular service request are provided to the capacity or resource broker by user equipment assisted mechanisms or by network based discovery mechanisms.

6. Method according to claim 1, wherein the service requests contain information on a service starting time or a duration, information on service level agreements, information on current location of users, user mobility related information, parameters for assisting traffic patterns predictability, or user mobility profiles.

7. A network management system for a shared Radio Access Network (RAN) infrastructure provided by a mobile network operator, the network management system comprising:
a master operator network manager of the mobile network operator for managing the shared RAN infrastructure, wherein the master operator network manager is configured to receive service requests from one or more tenants and to allocate resources to accommodate the service requests, and
wherein the master operator network manager is configured to cooperate with a network function, the network function being configured to consider information on mobility of a user or a set of users involved in a particular service request for deciding on resource allocations to the particular service request,
wherein the capacity or resource broker implements a forecasting function that performs traffic forecasting or user mobility forecasting,
wherein the traffic forecasting or the user mobility forecasting is performed by relying on historical data or current data, by exploiting temporal dependence forecasting models or spatial dependence forecasting models, by using signal processing based techniques, and by using recursive updating schemes.

8. The system according to claim 7, wherein the network function resides at or is implemented as part of the master operator network manager.

9. The system according to claim 7, wherein the network function is implemented as a logically centralized network function that is composed of functions that reside on the master operator network manager, on the master operator shared RAN domain manager, on shared network elements of the shared RAN infrastructure, on a policy and charging rules function (PCRF), or on the MME.

10. The system according to claim 7, wherein the network function implements a user mobility forecasting function.

11. The system according to claim 7, wherein the one or more tenants include mobile virtual network operators or application providers.

12. The system according to claim 7, wherein the existing 3GPP Int-N interface between the master operator network manager and the master operator shared RAN domain managers, the existing 3GPP Int-B interface between the master operator shared RAN domain managers and network elements of the shared RAN infrastructure, or the existing 3GPP Type 5 interface between the master operator network manager and sharing operator network managers of the tenants are extended to accommodate information contained in the service requests.

13. The system according to claim 7, wherein the Int-N interface between the master operator network manager and the master operator shared RAN domain managers or the Int-B interface between the master operator shared RAN domain managers and network elements of the shared RAN infrastructure or the Type 5 interface between the master operator network manager and sharing operator network managers of the tenants are configured to accommodate information regarding an over-the-top (OTT) application, an OTT session id, a service id, a service provider id, a public land mobile network (PLMN) id, information on the respective cells that are affected by a service request, information on the resource allocation, on the type of request, resource type, time duration, QoS or update information about off-loading policies.

14. The method according to claim 1, wherein the information on mobility comprises information on movement of a user device.

15. The method according to claim 1, wherein the information on mobility comprises at least one of whether a user has been stationary, an average speed of a user, a relative speed of a user, and an area in which the user has been moving.

* * * * *